M. HINE.
Chucks for Metal Lathes.

No. 147,937. Patented Feb. 24, 1874.

UNITED STATES PATENT OFFICE.

MERRITT HINE, OF NEW HAVEN, CONNECTICUT, ASSIGNOR TO HIMSELF AND HORACE P. DIBBLE, OF SAME PLACE.

IMPROVEMENT IN CHUCKS FOR METAL-LATHES.

Specification forming part of Letters Patent No. 147,937, dated February 24, 1874; application filed February 5, 1874.

*To all whom it may concern:*

Be it known that I, MERRITT HINE, of New Haven, in the county of New Haven and State of Connecticut, have invented a new Improvement in Drill-Chucks; and I do hereby declare the following, when taken in connection with the accompanying drawings and the letters of reference marked thereon, to be a full, clear, and exact description of the same, and which said drawings constitute part of this specification, and represent, in—

Figure 1:
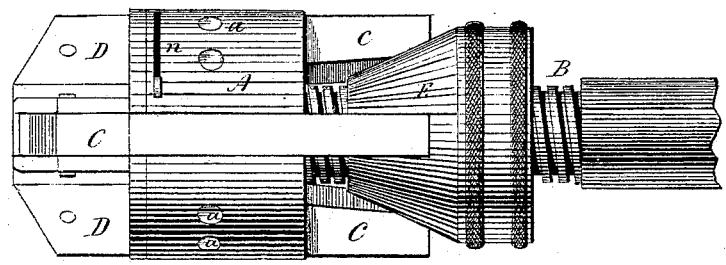
Figure 2:
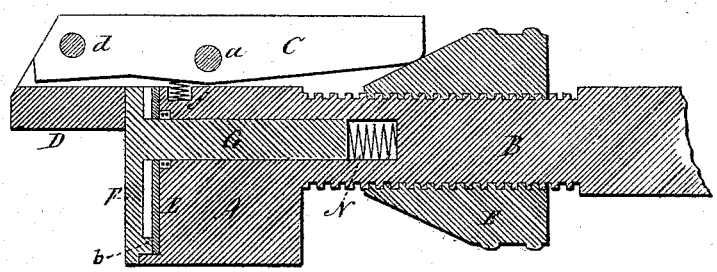
Figure 3:
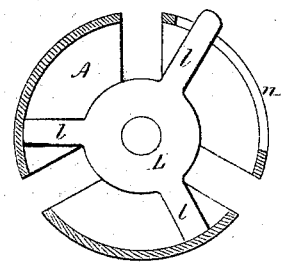
Figure 4:
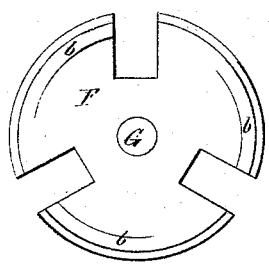

Figure 1, a side view; Fig. 2, a central section; Fig. 3, the head with the face-plate removed; Fig. 4, a rear view of the face-plate; and, in Fig. 5, a side view of the face-plate.

This invention relates to an improvement in the chuck for which Letters Patent were granted to Leander Parmelee, October 28, 1873, assignor to himself and this applicant, that patent being for the face-plate or disk between the jaws and head. In the use of that chuck for hand turning, the pressure upon the thing held by the chuck and being turned tends to throw back the plate and cause the jaw to yield. The object of this invention is to avoid this difficulty and adapt this chuck to hand turning; and it consists in combining, with the said plate and head, an intermediate disk with inclined surfaces on one part or the other, so that by turning the said disk the said plate may be rigidly set against the jaws, as more fully hereinafter described.

A is the head of the chuck, attached to or made a part of a threaded spindle, B, which extends back and is fitted to the mandrel of the lathe. In this head A are arranged two or more levers, C, preferably three, these levers pivoted in the head, as at *a*. Upon the forward end of each lever a jaw, D, is hung on a pivot, *d*, this jaw free to swing upon the said pivot, so that the edge of the jaw may assume a position at an angle with the axis of the head or parallel therewith. Upon the threaded spindle B a nut or sleeve, E, of conical shape, is placed, so as to be moved longitudinally by means of the thread on the spindle B. The other extreme of the levers rests upon this conical surface, so that by forcing the sleeve toward the head that end of the levers will be raised and the jaws depressed, and vice versa. Beneath the levers, forward of the pivot, a suitable spring, *f*, is arranged, the tendency of which is to force open the jaws when the sleeve E is withdrawn.

Figure 5:
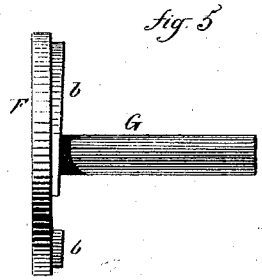

In order that the jaws shall always be in the same position to each other, I arrange between the jaws and the head a disk or face-plate, F, with a shank, G, running back into the head, so as to firmly support the plate and prevent any other than a longitudinal movement. In the rear of this plate, and, preferably, so as to bear against the shank, I arrange a spring, N, the tendency of which is to bear the plate F hard against the rear end of the jaws, so that the rear end of the jaws will, when free, lie flat against the disk; but if a tapering tool or article be placed between the jaws, so that when the jaws are forced thereon it will turn them out of line, the plate will be depressed to the same extent in the rear of all the jaws, and thus insure the equal inclination of the said jaws. In hand turning this yielding of the jaws must be avoided. To do this I construct the plate F with cam-shaped ribs *b* upon the inner surface, as seen in Figs. 4 and 5, and between the plate and head I place a disk, L, with arms *l*, corresponding to the ribs *b* on the plate F, one of these arms extending through a slot, *n*, in the head, so that by the said arm the disk L may be turned, and in so turning the arms *l* pass around between the ribs *b* on the plate F and the head, and wedge the plate hard against the jaws D, so that they will not yield. Returning the disk L, the plate F is again free to yield to the jaws, as before.

Instead of forming the ribs *b* on the plate, they may be formed on the head with the same result.

I claim as my invention—

The head A, having two or more levers, C, arranged therein, provided with a spindle, B, and conical sleeve E, and the jaws pivoted upon the forward end of the lever, combined with the plate F, constructed with ribs *b*, and the disk L, provided with arms *l*, corresponding to said ribs, substantially as and for the purpose specified.

MERRITT HINE.

Witnesses:
JOHN E. EARLE,
A. J. TIBBITS.